US005520766A

United States Patent [19]

Iwasaki

[11] Patent Number: 5,520,766

[45] Date of Patent: May 28, 1996

[54] TACK LABEL ROLL AND PROCESS FOR PRODUCING PRINTED MATTER

[75] Inventor: Shinichi Iwasaki, Kawasaki, Japan

[73] Assignee: Canon Aptex Inc., Ibaraki-ken, Japan

[21] Appl. No.: 222,871

[22] Filed: Apr. 5, 1994

[30] Foreign Application Priority Data

Apr. 5, 1993 [JP] Japan .............................. 5-022011 U

[51] Int. Cl.[6] .................................................. B32B 31/00

[52] U.S. Cl. ......................... 156/277; 156/289; 428/42.3; 283/117

[58] Field of Search .................................... 156/277, 289, 156/250, 252, 253; 428/40; 283/117

*Primary Examiner*—Chester T. Barry
*Attorney, Agent, or Firm*—Fitzpatrick, Cella, Harper & Scinto

[57] ABSTRACT

A tack label roll for printing is comprised of a continuous release sheet backing web in a roll shape and a plurality of labels stuck thereon at regular intervals. Ink absorption zones are formed on uncovered interval areas of the release sheet backing web between the labels.

4 Claims, 2 Drawing Sheets

TACK LABEL ROLL AND PROCESS FOR PRODUCING PRINTED MATTER

BACKGROUND OF THE INVENTION

1. Field of the Invention

The present invention relates to a tack label roll for a printing apparatus which conducts printing with a liquid ink. The present invention also relates to a process for producing a printed matter by use of the above tack label roll.

2. Related Background Art

In printing on a tack label or a similar continuous body with an ink-jet head having juxtaposed printing nozzles, a problem is encountered that ink ejection is liable to fail by clogging of the nozzle owing to evaporation of ink at the nozzle tip. To prevent the failure of ink ejection, a method was considered that all of the nozzles of the printing head are used for ink ejection one or more times for every label to print a line at an area where contents of the print are not disturbed, for example, at the top portion or bottom portion of the label. In this method, however, label design is restricted, or label size needs to be larger, disadvantageously.

Another method also considered involved ejecting ink from all of the nozzles intermittently onto an ink recovery cap or the like, not onto a printing label. When the latter method is employed in tack label printing, the cap cannot be placed opposite to the printing head because of the continuous shape of the tack label roll, and therefore the cap or the head has to be moved at the ink ejection onto the cap. Thereby the printing has to be interrupted for this operation, which reduces disadvantageously the throughput of the print per unit time.

The disadvantage results from lack of an ink-absorbing property of the ground paper, i.e., a release sheet backing web, of the tack label. The tack label roll is formed by sticking an overlay paper sheet (i.e., pressure sensitive labels for printing) having adhesive at the back face thereof onto a ground paper sheet (namely, a separator, or releasing paper). The ground paper is made from a material having sufficient releasing property so as to secure the ease of releasing of the overlay paper. Frequently, polyethylene is laminated, or silicone oil is applied on the label side face of the ground paper. Accordingly, liquid ink applied from a nozzle is not absorbed by the ground paper and remains on the surface thereof in a round shape owing to the surface tension. This remaining liquid ink may stain the inside of a printer or neighboring labels, thereby impairing the quality of the printing on the labels on the overlay paper.

SUMMARY OF THE INVENTION

The present invention intends to offset the above disadvantages of tack label rolls of prior art, and intends to provide a tack label roll which enables ink-jet printing on a label roll with all nozzles of a printing head without inconvenience in label design and without ink ejection failure caused by ink evaporation at the tip of nozzles.

The present invention provides a tack label roll for printing constituted of a continuous ground paper sheet in a roll shape and a plurality of labels stuck thereon at an interval, with ink absorption zones being formed on uncovered interval areas of the ground paper between the labels.

The present invention also provides a process for producing a printed matter, comprising conducting ink-jet printing on a tack label roll for printing, the tack label roll being constituted of a continuous ground paper sheet in a roll shape and a plurality of labels stuck thereon at an interval, with ink absorption zones being formed on uncovered interval areas of the ground paper between the labels.

DESCRIPTION OF THE PREFERRED EMBODIMENTS

Figure 1:
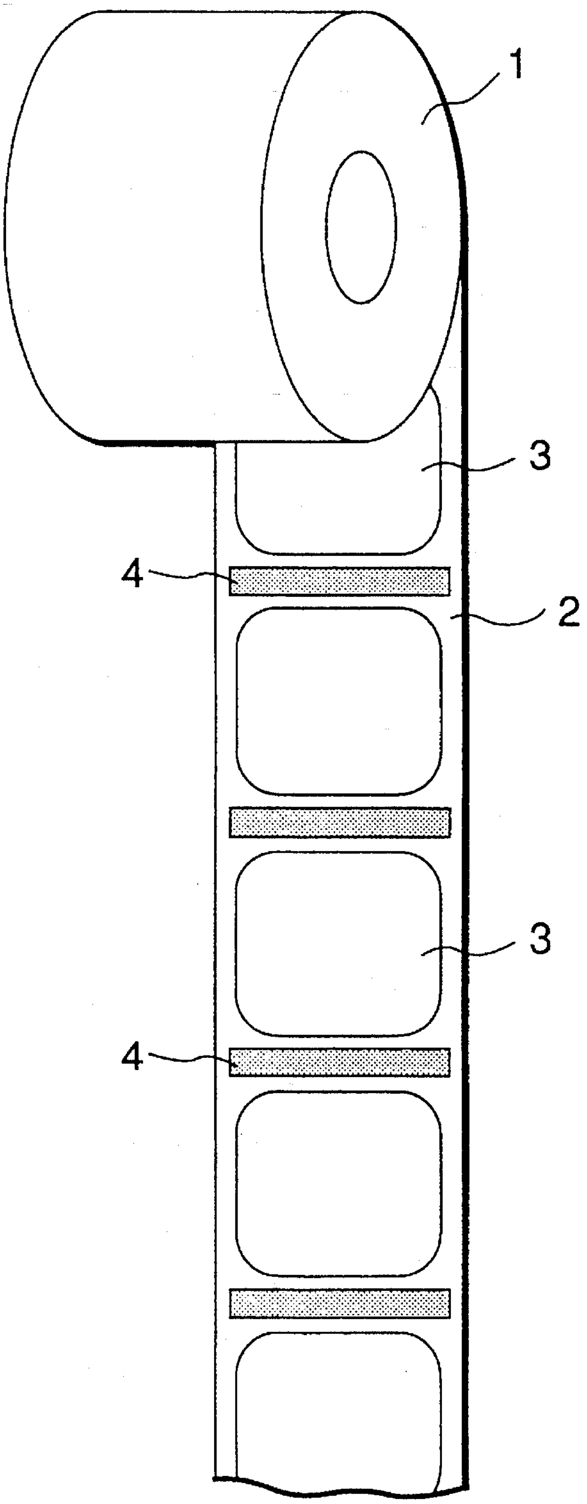
FIG. 1 illustrates a tack label roll of the present invention.
Figure 2:
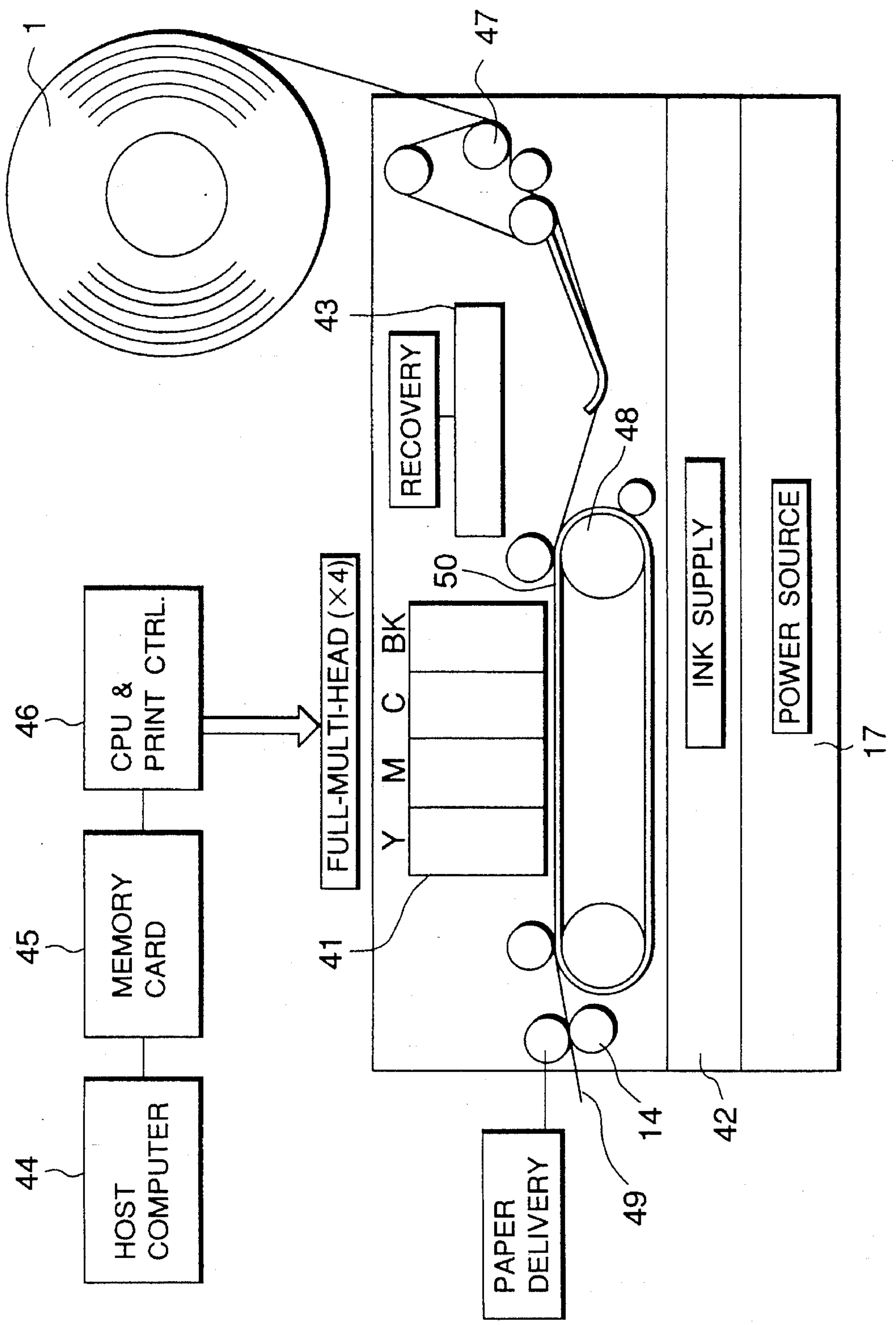
FIG. 2 is a printing apparatus with a tack label roll of the present invention.

FIG. 2 shows an example of the printing apparatus to which the present invention is applicable. The printing apparatus conducts printing on rolled paper (i.e., a roll of paper) 1 such as continuous label paper. The rolled paper is capable of meeting readily load variation in paper delivery and is suitable for practice of the present invention. The above printing apparatus is employed, for example, in printing of letters, picture images, and bar codes.

A rolled paper 1 is delivered by delivery rollers 47, a main roller 48, and a belt 50 to a printing section, and printing is conducted there with a printing head 41. The rolled paper 1 after printing is discharged from an outlet 49 by paper delivery roller 14.

The printing head 41 is constituted of ink-jet heads for four colors of Y, M, C, and Bk. The respective color inks are supplied from an ink supply system 42. A recovery system 43 conducts recovery of ink ejection of the printing head. Each color head is of a full-multi-type one which is capable of printing over the entire breadth of the rolled paper. A capping means and a sucking means are provided in the recovery system 43. The ink-jet recording system includes on-demand type and continuous type. The printing head 41 in FIG. 2 is of a type which utilizes thermal energy for ink ejection and enables higher speed printing among ink-jet recording systems.

A host computer 44 sends image data signals to the printing apparatus. A memory card 45 stores format, contents, or the like of printing. A CPU 46 controls practice of printing.

The tack label roll of the present invention, which has ink absorption zones formed in uncovered interval areas between the plurality of tack labels, enables use of every nozzle of the ink head of ink-jet printer. Thereby, every nozzle is prevented effectively from failure of ink ejection owing to ink evaporation at the nozzle tip or other causes. The tack label also gives the merit of no decrease of printing speed in label printing because every nozzle is ready for ink ejection.

The present invention is described more specifically by reference to Examples.

EXAMPLE 1

A tack label roll was produced in a conventional manner by sticking a raw overlay paper sheet with an adhesive on a raw ground paper sheet, die-punching the overlay paper sheet in a label size to leave label portions on the ground paper sheet, winding the ground paper sheet into a roll, and cutting the roll into round slices. In this Example, at the step of winding, the uncovered areas of the ground paper at the intervals between the overlying labels were irradiated with laser beams, or subjected to application of a strong electric field generated by a number of needle-shaped protrusions in proximity to the tack roll. Thereby pin holes were formed at a density of about 100 holes in 1 $mm^2$.

The suitable hole size depends on the smallest print dot size and the kind of the ground paper used. For widely used glassine-based ground paper, the hole is preferably has a diameter ranging from 10 μm to 50 μm.

EXAMPLE 2

A tack label roll of the present invention was prepared by forming ink absorption zones by application of a blend of a binder resin with a porous material or by formation of a layer of the above blend.

This step may be conducted at any time after the die-punching of the overlying label and before winding the ground paper.

The binder resin is used for fixing the porous material onto the ground paper, and is selected in consideration of compatibility with the ground paper or a laminated polymer.

In this Example, the ink absorption zones are formed selectively on the uncovered areas of the ground paper between the overlying labels. However, similar results can be achieved by use of a ground paper which has holes of not more than 50 μm throughout the entire face of the ground paper sheet as in Example 1.

The tack label roll of the present invention has ink absorption zones in the interval areas between tack labels. Therefore, in ink-jet printing, all of the nozzles can be used for printing, and every nozzle is prevented effectively from ink ejection failure resulting from ink evaporation or other causes. This tack label roll gives a merit that label printing is conducted without lowering of printing speed because all the nozzles are used for ink ejection during printing.

What is claimed is:

1. A roll of label paper for printing comprising a roll of discrete spaced pressure-sensitive adhesive labels on a release sheet backing web having ink absorption zones between said labels, wherein each of said zones comprises an exposed release sheet surface bearing a plurality of holes having a diameter of 50 μm or smaller.

2. A roll of label paper for printing comprising a roll of discrete spaced pressure-sensitive adhesive labels on a release sheet backing web having ink absorption zones between said labels, wherein each of said zones comprises an ink absorption layer.

3. A process for producing a printed matter, comprising the steps of:

providing a roll of label paper for printing comprising a roll of discrete spaced pressure-sensitive adhesive labels on a release sheet backing web having ink absorption zones between said labels, wherein each of the zones comprises an exposed release sheet surface bearing a plurality of holes having a diameter of 50 μm or smaller; and conducting ink jet printing on the labels.

4. A process for producing a printed matter, comprising the steps of:

providing a roll of label paper for printing comprising a roll of discrete spaced pressure-sensitive adhesive labels on a release sheet backing web having ink absorption zones between said labels, wherein each of the zones comprises an ink absorption layer; and conducting ink jet printing on the labels.

* * * * *